May 17, 1960 I. HOROWITZ 2,937,274
DEMODULATOR
Filed Jan. 24, 1958
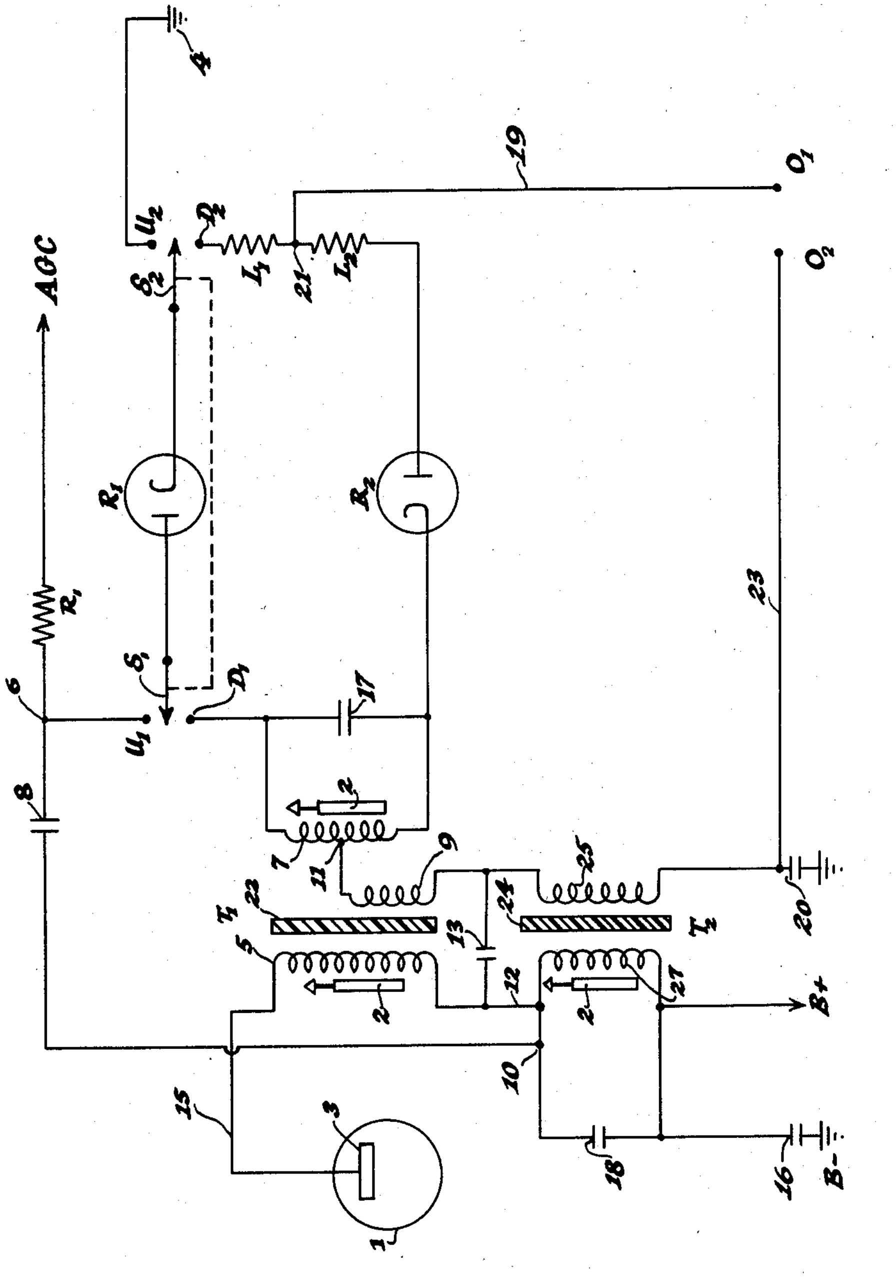
INVENTOR.
Irving Horowitz
BY Rines and Rines
ATTORNEYS 2,937,274

DEMODULATOR

Irving Horowitz, Eatontown, N.J., assignor to U.V. Mfg. Corp., Newark, N.J., a corporation of New Jersey Application January 24, 1958, Serial No. 711,001

4 Claims. (Cl. 250—27)

The present invention relates to demodulators and, more particularly, to combined amplitude-modulation and frequency-modulation demodulator circuits.

The art is replete with different types of demodulator circuits for recovering the signal intelligence carried as amplitude and frequency modulation upon the broadcast carrier frequencies. When, however, a combined amplitude- and frequency-modulation demodulator is to be incorporated into an equipment, such as in A.M.-F.M. tuners or radio-receiving sets, it has heretofore been difficult to provide a simple and an inexpensive common circuit that could perform both demodulation functions and that is safe from the standpoint of isolating voltages from the controls or other points of the equipment accessible to the user. The use of a pair of rectifiers in the conventional frequency-modulation ratio detector demodulator and a further rectifier in the amplitude-modulation automatic gain control circuit of such equipment has previously generally been considered essential, as has the use of an isolation power transformer for protecting the output of the demodulator from developing unsafe voltages existent in the equipment. These electrical components, however, have disadvantageously added appreciably to the complexity and cost of such equipment.

An object of the present invention, accordingly, is to provide a new and improved demodulator of this character that shall not be subject to the above disadvantages but that, to the contrary, shall be far more simple and less expensive, shall completely eliminate the necessity for isolation power transformers with their attendant disadvantages, and yet that shall be fully equivalent, performance-wise, to the prior-art equipments of this nature. In summary, this end is achieved, as more fully explained hereinafter, through the novel use of appropriate inexpensive switching and insulation means associated with the ratio detector circuit and the frequency-modulation and amplitude-modulation transformer circuits.

Other and further objects will be explained hereinafter and will be more particularly pointed out in the appended claims.

The invention will now be described in connection with the accompanying drawing the single figure of which is a schematic circuit diagram of the invention in preferred form.

The intermediate-frequency output electron-tube stage 1 of an A.M.-F.M. tuner or receiver, serving as a source of both the conventional low broadcast carrier frequency amplitude-modulated signals and the high carrier-frequency frequency-modulated signals, has its plate or anode 3 connected by conductor 15 to the upper terminal of the primary winding 5 of a transformer $T_1$. The transformer $T_1$ is provided with a main secondary winding 7 and an auxiliary secondary or phase winding 9 connected between an intermediate point 11 of the winding 7 and, through capacitance 13, the lower terminal of the primary winding 5. The transformer circuit $T_1$ with the associated capacitance 17 shunting the main secondary winding 7, is tuned, as by movable slugs 2 within the windings 5 and 7, to the high carrier frequency that is frequency modulated. When preferably ganged switch contactors $S_1$ and $S_2$ are in the down position, engaging terminals $D_1$ and $D_2$, respectively, the secondary winding 7 is connected at its upper terminal through a rectifier $R_1$ to the upper terminal of a load resistor $L_1$; and, at its lower terminal, through an oppositely poled rectifier $R_2$ to the lower terminal of a similar load resistor $L_2$. This circuit $T_1$, $R_1$, $R_2$, $L_1$, $L_2$ will be recognized as a rather conventional type of ratio detector circuit, generally represented by the numeral 2, for demodulating the frequency-modulation intelligence upon the high carrier frequency. The demodulated frequency-modulation signal will be available between output terminal $O_1$, connected by conductor 19 to the intermediate point 21 between the load resistors $L_1$ and $L_2$, and output terminal $O_2$, connected by conductor 23, which is preferably provided with a high-frequency by-pass condenser 20, through the secondary winding 25 of a hereinafter described further transformer $T_2$, to the lower terminal of the secondary phase winding 9.

In accordance with the present invention, the same rectifiers $R_1$ and $R_2$ can be used for detecting the low carrier frequency amplitude-modulation signals without the necessity for additional rectifier circuits. When the switch members $S_1$, $S_2$ are moved to their upper positions, engaging respective terminals $U_1$ and $U_2$, the rectifier $R_1$ is disconnected from the ratio detector circuit 2, rendering the ratio detector circuit inoperative to demodulate the high carrier frequency signal. In addition, switch $S_2$ will connect the right-hand terminal of rectifier $R_1$ through terminal $U_2$ to a ground connection 4, while switch $S_1$ connects the lefthand terminal of rectifier $R_1$ to the junction 6 between a conventional automatic gain control circuit AGC and a capacitor 8 that couples to a point 10 at which the amplitude-modulated carrier is present. The same rectifier $R_1$ that served as the upper arm of the frequency-modulation ratio detector 2, is thus now serving the function of automatic gain control signal development.

The upper terminal of the primary winding 27 of the before-mentioned transformer $T_2$, moreover, is connected by conductor 12 through the primary winding 5 of the transformer $T_1$ to the plate 3 of the tube 1, thus applying the low carrier frequency amplitude-modulated signal thereto. The lower terminal of the winding 27 connects to the positive source of plate voltage B+ for the tube 1, being decoupled to the B− or ground terminal by a by-pass condenser 16. The transformer $T_2$, with the capacitance 18 shunting the primary winding 27, is tuned to the low carrier frequency so that the amplitude-modulated signal is applied from the upper terminal of the secondary winding 25 through phase winding 9 of the transformer $T_1$, and the lower portion of the secondary winding 7 thereof to the lower rectifier $R_2$ of the now ineffective frequency-modulation ratio detector 2. Since the tuning of the ratio detector transformer circuit $T_1$ to the high carrier frequency has rendered the impedance of this path between the secondary winding 25 and the rectifier $R_2$ small for the low carrier frequency amplitude-modulated signal, a strong amplitude-modulation signal is applied to the rectifier $R_2$, providing, at the output terminals $O_1$, $O_2$, the demodulated amplitude-modulation signal.

The present invention, through the novel application of the switches $S_1$, $S_2$ and the associated circuits, has thus enabled the same circuit elements to be used optionally for the amplitude- or frequency-modulation demodulation, and without the necessity for additional rectifiers or other additional electrical components. More than this, by providing rugged insulation separator members 22 and 24, respectively, between the magnetically coupled windings 5–9 and 27–25 of the respective transformers $T_1$ and $T_2$, any dangerous or undesirable potentials applied between B— or B+ and output terminals $O_1$ or $O_2$ are prevented from becoming a shock hazard, thus obviating the necessity for isolation power transformers with their attendant disadvantages.

Further modifications will occur to those skilled in the art and all such are considered to fall within the spirit and scope of the invention as defined in the appended claims.

What is claimed is:

1. A combined low carrier frequency amplitude-modulation and high carrier frequency frequency-modulation demodulator having, in combination, a source of the amplitude- and frequency-modulation signals, a ratio detector circuit comprising primary and secondary transformer circuits tuned to the high carrier frequency, means for connecting the said primary circuit to the source, a pair of oppositely poled rectifiers connected in series with a load and to opposite terminals of the said secondary circuit, a further transformer circuit the primary of which is connected to the source and which is tuned to the low carrier frequency, a demodulated-signal output circuit connected between the load and a point connected with the secondary circuits of both transformer circuits, switching means for optionally connecting one of the rectifiers into and disconnecting the same from the ratio detector circuit, means controlled by the switching means when disconnecting the said one rectifier from the ratio detector circuit for connecting the same into an automatic gain control circuit connected to the source, and means for connecting the further transformer secondary circuit to the secondary circuit of the ratio detector circuit, the impedance of the latter at the low carrier frequency being sufficiently small to permit the low carrier frequency to propagate therethrough in order to be detected in the other of the said pair of rectifiers.

2. A combined low carrier frequency amplitude-modulation and high carrier frequency frequency-modulation demodulator as claimed in claim 1 and in which the primary and secondary circuits of the ratio detector transformer and of the further transformer, while closely magnetically coupled, are separated from one another by insulation members.

3. A combined low carrier frequency amplitude-modulation and high carrier frequency frequency-modulation demodulator as claimed in claim 1 and in which the ratio detector secondary circuit comprises a main secondary winding and an auxiliary phase winding connected between a terminal of the further transformer secondary circuit and an intermediate point of the said main secondary winding.

4. A combined low carrier frequency amplitude-modulation and high carrier frequency frequency-modulation demodulator as claimed in claim 1 and in which the said automatic gain control circuit is connected back to a terminal of the further transformer primary circuit.

References Cited in the file of this patent

FOREIGN PATENTS 928,180 Germany -------------- Apr. 28, 1955